(12) United States Patent
Kameda et al.

(10) Patent No.: US 7,545,603 B2
(45) Date of Patent: Jun. 9, 2009

(54) MAGNETIC HEAD AND MANUFACTURING METHOD THEREOF

(75) Inventors: Hiroshi Kameda, Tokyo (JP); Eiji Ozaki, Tokyo (JP)

(73) Assignee: TDK Corporation, Tokyo (JP)

( * ) Notice: Subject to any disclaimer, the term of this patent is extended or adjusted under 35 U.S.C. 154(b) by 297 days.

(21) Appl. No.: 11/115,621

(22) Filed: Apr. 27, 2005

(65) Prior Publication Data

US 2005/0243466 A1 Nov. 3, 2005

(30) Foreign Application Priority Data

Apr. 30, 2004 (JP) ............................. 2004-135384

(51) Int. Cl.
*G11B 5/127* (2006.01)
*G11B 5/31* (2006.01)

(52) U.S. Cl. .............. 360/125.03; 360/122; 360/125.14

(58) Field of Classification Search ................. 360/122, 360/125, 126, 125.03, 125.1, 125.11, 125.14, 360/125.15, 125.47, 125.48, 125.6, 125.61
See application file for complete search history.

(56) References Cited

U.S. PATENT DOCUMENTS

| | | | |
|---|---|---|---|
| 6,813,116 B2 * | 11/2004 | Nakamura et al. | 360/125 |
| 7,006,326 B2 * | 2/2006 | Okada et al. | 360/125 |
| 7,100,266 B2 * | 9/2006 | Plumer et al. | 29/603.14 |
| 7,133,252 B2 * | 11/2006 | Takano et al. | 360/125 |
| 2003/0151850 A1 * | 8/2003 | Nakamura et al. | 360/125 |
| 2004/0179297 A1 * | 9/2004 | Kameda | 360/126 |
| 2005/0237665 A1 * | 10/2005 | Guan et al. | 360/125 |
| 2006/0256471 A1 * | 11/2006 | Plumer et al. | 360/122 |

FOREIGN PATENT DOCUMENTS

| | | |
|---|---|---|
| JP | 57-207338 | 12/1992 |
| JP | 10-105920 | 4/1998 |
| JP | 11-250416 | 9/1999 |
| JP | 2003-242607 | 8/2003 |
| JP | 2004-127480 | 4/2004 |
| JP | 2004-139663 | 5/2004 |

OTHER PUBLICATIONS

Notice of Preliminary Rejection for corresponding Japanese Patent Application Serial No. 2004-135384, dated Jul. 24, 2007.
Office Action issued in corresponding Japanese Patent Application No. 2004-135384; issued on Mar. 25, 2008.

* cited by examiner

*Primary Examiner*—William J Klimowicz
(74) *Attorney, Agent, or Firm*—Brinks Hofer Gilson & Lione

(57) ABSTRACT

A magnetic head and a manufacturing method thereof which can suppress side fringing and permeation of a recording magnetic field in the first direction while maintaining the intensity of a recording magnetic field. By making a length of a trailing upper surface of a front portion in a height direction longer than a length of a leading lower surface of the front portion in the height direction, a generated magnetic field of the trailing upper surface can be comparatively weakened, to suppress side fringing and magnetic field permeation of a recording magnetic field. The recording magnetic field can be kept large enough by shortening the length of the leading lower surface in the height direction to intensify a generated magnetic field generated from the leading side.

7 Claims, 16 Drawing Sheets

MAGNETIC HEAD AND MANUFACTURING METHOD THEREOF

This application claims priority to Japanese Patent Application No.: 2004-135384, filed on Apr. 30, 2004, which is incorporated herein by reference.

TECHNICAL FIELD

The present application relates to a magnetic head a manufacturing method thereof and, in particular, to a magnetic head capable of reducing the side fringing and permeation of the recording magnetic field.

BACKGROUND

A recording magnetic head of a vertical magnetic field recording type that magnetizes a recording medium in the vertical direction has a first magnetic layer whose front surface is formed in a first direction with a predetermined width on a facing surface, the facing surface being disposed so as to oppose the recording medium.

FIG. 14 is a schematic perspective view showing a conventional recording magnetic head of vertical magnetic recording type. In the recording magnetic head of vertical magnetic recording type, on the facing surface F toward a recording medium, a first magnetic layer 1 (a main magnetic pole layer) and a second magnetic layer 2 face each other with a gap therebetween in the direction of a film thickness. A front surface of the first magnetic layer 1 is formed on the facing surface with a predetermined width in the first direction. Further, although not shown in FIG. 14, a coil layer is formed between the first magnetic layer 1 (the main magnetic pole layer) and the second magnetic layer 2. An induced magnetic field generated when electric current flows through the coil layer is induced in the first magnetic layer 1 (the main magnetic pole layer) and the second magnetic layer 2, and a recording magnetic field is incident on the recording medium in a direction vertical to the recording medium surface from the front surface of the first magnetic layer 1. The recording magnetic field reaches the second magnetic layer 2 after passing through the recording medium.

In the first magnetic layer 1 (the main magnetic pole layer) of the magnetic head shown in FIG. 14, the angle formed between a side surface 1d of a front portion S1 and the facing surface toward the recording medium is larger than the angle formed between a side surface 1e of an inclined portion S2 and the facing surface toward the recording medium. The angles are measured with respect to the facing surface with a sense of rotation such that a maximum angle is 90°. A rear portion S3 which is wider than the front portion S1 is formed at the rear side of the inclined portion S2.

As shown in FIG. 14, below the first magnetic layer (the main magnetic pole layer) 1, a slider which mounts the magnetic head is arranged, and the recording medium moves from the bottom to the top (in the figure). In FIG. 14, the downward direction is a leading side L and the upward direction is a trailing side T.

When a direction orthogonal to the first direction is a second direction (Y direction in the figure), in the first magnetic layer 1, a length L1 of a trailing upper surface 1b of the front portion S1 in the second direction is equal to a length L2 of a leading lower surface 1c of the front portion S1 in the second direction.

FIG. 15 is a schematic perspective view showing another conventional magnetic head. The magnetic head is also a recording head of vertical magnetic recording type, and similar to the magnetic head in FIG. 14, a first magnetic layer 3 and a second magnetic layer 2 face each other. A coil layer provided between the first magnetic layer 3 and the second magnetic layer 2 is omitted from the figure.

In the first magnetic layer 3, the length L1 of a trailing upper surface 3b of the front portion S1 in the second direction (Y direction in the figure) is shorter than the length L2 of a leading lower surface 3c of the front portion S1 in the second direction.

Japanese Unexamined Patent Application No. 11-250416 (Page 3, FIG. 1) is an example of related art. In the vertical magnetic recording field type, in forming a recording magnetized pattern on the recording medium, a recording magnetic field generated from a trailing edge of a front surface 1a of a first magnetic layer (a main magnetic pole layer) is dominant.

FIG. 16A is an enlarged fragmentary side view of the vicinity of the first magnetic layer (the main magnetic pole layer) 1 and the second magnetic layer 2 in the magnetic head shown in FIG. 14, FIG. 16B shows a magnetic field distribution of a recording magnetic field generated from the front surface of the main magnetic pole layer at the facing surface F toward the recording medium, and FIG. 16C is a plan view of a recording track on the recording media on which signals are recorded by the magnetic head.

As shown in FIG. 16, if the length L1 of a trailing upper surface of the front portion S1 in the second direction is equal to the length L2 of a leading lower surface of the front portion S1 in the second direction, a generated magnetic field of the trailing upper surface is strengthened, and then the width of a recording track on the recording medium caused by side fringing and magnetic field permeation of the recording magnetic field at the trailing side becomes larger than a width Tw of the front surface of the first magnetic layer 1 (the main magnetic pole layer), which causes a problem that a practical track width Tv increases.

FIG. 17A is an enlarged fragmentary side view of the vicinity of the first magnetic layer 3 and the second magnetic layer 2 in the magnetic head of FIG. 15. FIG. 17B shows a magnetic field distribution of the recording magnetic field generated from the front surface of the first magnetic layer 3 at the facing surface F toward the recording medium, and FIG. 17C is a plan view of the recording track on the recording medium.

As shown in FIG. 17, if the length L1 of the trailing upper surface 3b of the front portion S1 in the second direction is shorter than the length L2 of the leading lower surface 3c of the front portion S1 in the second direction, the generated magnetic field of the trailing upper surface 3b becomes much stronger than that of FIG. 16, which causes a problem that the practical track width caused by side fringing and magnetic field permeation of the recording magnetic field at the trailing side becomes larger.

FIG. 18 shows an enlarged fragmentary side view of the vicinity of an upper magnetic pole layer 4 (a main magnetic pole layer) and a lower magnetic pole layer 5 in the magnetic head disclosed in Japanese Unexamined Patent Application No. 11-250416, and a magnetic field distribution of the recording magnetic field generated from a front surface of the upper magnetic pole layer 4. As shown in FIG. 18, Japanese Unexamined Patent Application No. 11-250416 discloses a recording head in which the front surface 4a of the upper magnetic pole layer 4 becomes an inclined surface or a stepped surface which is away from the recording medium from the leading side L toward the trailing side T. According to Japanese Unexamined Patent Application No. 11-250416, the trailing side of the upper magnetic pole layer 4 can be kept away from the recording medium to decrease the generated magnetic field at the trailing side of the upper magnetic pole 4. However, as shown in FIG. 18, the magnetic field distribution of the recording magnetic field generated from the front surface of the upper magnetic pole layer 4 is concentrated on the vicinity of a gap 6 which makes it difficult to supply a sufficient amount of recording magnetic field to the recording magnetic medium.

SUMMARY

A magnetic head and a manufacturing method thereof which can suppress side fringing and permeation of a recording magnetic field in a first direction while maintaining the intensity of the recording magnetic field is described.

When describing the drawings, the X direction is the first direction and is parallel to the facing surface, and may be known as the "track width" dimension; the Y direction is the second direction and is perpendicular to the facing surface and may be known as the "height" direction; and, the Z axis is the third dimension and may be known as the "thickness" or "film width" direction. The sense of the directions is shown by the Cartesian coordinate system on the drawings.

A magnetic head may include a first magnetic layer and a second magnetic layer facing each other with a predetermined gap in a film width direction on a facing surface toward a recording medium, a coil layer formed between the first magnetic layer and the second magnetic layer, and a front surface of the first magnetic layer formed with a predetermined width in a first direction on the facing surface. The first magnetic layer has a front portion and an inclined portion, the side surfaces of which extend in directions crossing the first direction and form different angles, where the difference may be at least one of sign, from each other with respect to the facing surface, and an angle formed between the side surface of the front portion and the facing surface is larger than an angle formed between the side surface of the inclined portion and the facing surface. A direction orthogonal to the first direction is a second direction, and a length of a trailing upper surface of the front portion in the second direction is larger than a length of a leading lower surface of the front portion in the second direction.

A practical width of a recording track on the recording medium becomes larger if side fringing and magnetic permeation of the recording magnetic field occur at the trailing side of the first magnetic layer.

Since the length of the trailing upper surface of the front portion of the first magnetic layer in the second direction is larger than the length of the leading lower surface of the front portion in the second direction, the generated magnetic field of the trailing upper surface can be comparatively weakened, and side fringing and magnetic field permeation of a recording magnetic field can be reduced. Accordingly, the practical width of a recording track can be made substantially or exactly equal to the width of the front surface of the first magnetic layer.

The length of the leading lower surface in the second direction can be shortened to keep a recording magnetic field large enough.

In order to make a recording magnetic field large enough, preferably, the front surface of the first magnetic layer is a surface parallel to the facing surface.

Preferably, the front surface of the first magnetic layer is completely exposed to the facing surface. The front portion and the inclined portion of the first magnetic layer may be formed on the same plane, and a trailing upper surface of the front portion and a trailing upper surface of the inclined portion are on the same plane. This may make the flow of magnetic flux inside the first magnetic layer smooth and increase a recording magnetic field generated from the upper surface of the first magnetic layer.

A manufacturing method is described for a magnetic head including a first magnetic layer and a second magnetic layer facing each other with a predetermined gap in a film width direction on a facing surface toward a recording medium, a coil layer formed between the first magnetic layer and the second magnetic layer, and a front surface of the first magnetic layer formed with a predetermined width in a first direction on the facing surface.

The first magnetic layer is formed through the steps of:

(a) forming a planar concave portion of the first magnetic layer on a mask layer; providing, in the concave portion, a front portion and an inclined portion of which inner surfaces extend in directions crossing the first direction and form different angles from each other with respect to the facing surface, and making an angle between the inner surface of the front portion and the facing surface larger than an angle between the inner surface of the inclined portion and the facing surface; in a second direction orthogonal to the first direction, making a length of an upper end of the inner surface of the front portion in the second direction larger than a length of a lower end of the inner surface of the front portion in the second direction;

(b) plating the first magnetic layer in the concave portion of the mask layer; and (c) removing the mask layer.

By using the manufacturing method, the length of the trailing upper surface of the front portion in the second direction can be made longer than the length of the leading lower surface of the front portion in the second direction.

If the length of the trailing upper surface of the front portion of the first magnetic layer in the second direction is longer than the length of the leading lower surface of the front portion in the second direction, a generated magnetic field of the trailing upper surface can be comparatively weakened, and side fringing and magnetic field permeation of the recording magnetic field can be suppressed. Accordingly, the practical width of a recording track can be made substantially or exactly equal to the width of the front surface of the first magnetic layer.

Further, the length of the leading lower surface in the second direction can be shortened to keep a recording magnetic field sufficiently large.

In step (a), as a method to make the length of the upper end of the inner surface of the front portion in the second direction longer than the length of the lower end of the inner surface of the front portion in the second direction, the concave portion of the mask layer is formed by using an exposing and developing means, and an irradiation energy when the inclined portion is exposed is greater than an irradiation energy when the front portion is exposed.

If EB (electron beam) exposure is used as the exposing means, the irradiation energy can be continuously altered. Thus, the irradiation energy when the inclined portion of the concave portion is exposed and the irradiation energy when the front portion is exposed can be easily controlled.

Preferably, the mask layer is formed on a planar region in step (a), and a trailing upper surface of the front portion of the first magnetic layer formed in the front portion of the concave portion and a trailing upper surface of the inclined portion of the first magnetic layer formed in the inclined portion of the concave portion are positioned on the same plane in the step (b).

The method may further include, after the process (c), a step of (d) shaving off the front portion of the first magnetic layer parallel to the facing surface, and making the front surface of the front portion at the facing surface a surface parallel to the facing surface. As a result, since the front surface of the first magnetic layer can be made a flat surface, a recording magnetic field generated from the magnetic head can be increased.

The front surface of the first magnetic layer may be completely exposed to the facing surface in step (d).

Since the length of the trailing upper surface of the front portion of the first magnetic layer in the second direction is larger than the length of the leading lower surface of the front portion in the second direction, the generated magnetic field of the trailing upper surface can be comparatively weakened to suppress side fringing and magnetic field permeation of a recording magnetic field. Accordingly, the practical width of a recording track can be made substantially or exactly equal to the width of the front surface of the first magnetic layer.

In addition, the length of the leading lower surface in the second direction can be shortened to keep the recording magnetic field sufficiently large.

Furthermore, the front surface of the first magnetic layer can be made a surface parallel to the facing surface to increase a recording magnetic field.

The front portion and the inclined portion of the first magnetic layer may be formed on the same plane, and the upper surface of the front portion and the upper surface of the inclined portion may be on the same plane. This arrangement can make the flow of magnetic flux inside the first magnetic layer smooth and increase a recording magnetic field generated from the upper surface of the first magnetic layer.

DETAILED DESCRIPTION

Exemplary embodiments may be better understood with reference to the drawings, but these examples are not intended to be of a limiting nature. Like numbered elements in the same or different drawings perform equivalent functions.

Figure 1:
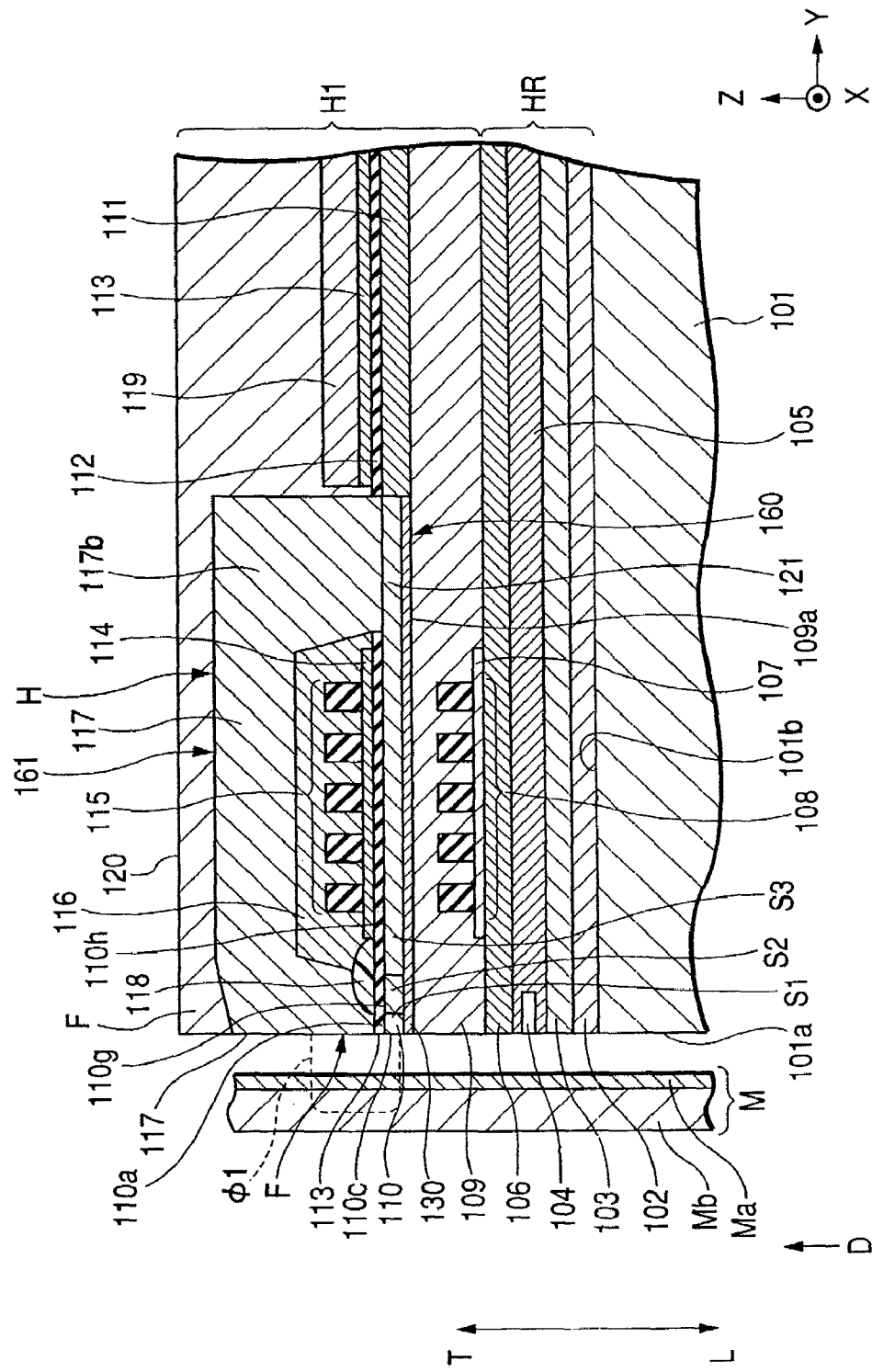
FIG. 1 is a cross-sectional view showing a magnetic head according to a first embodiment.
Figure 2:
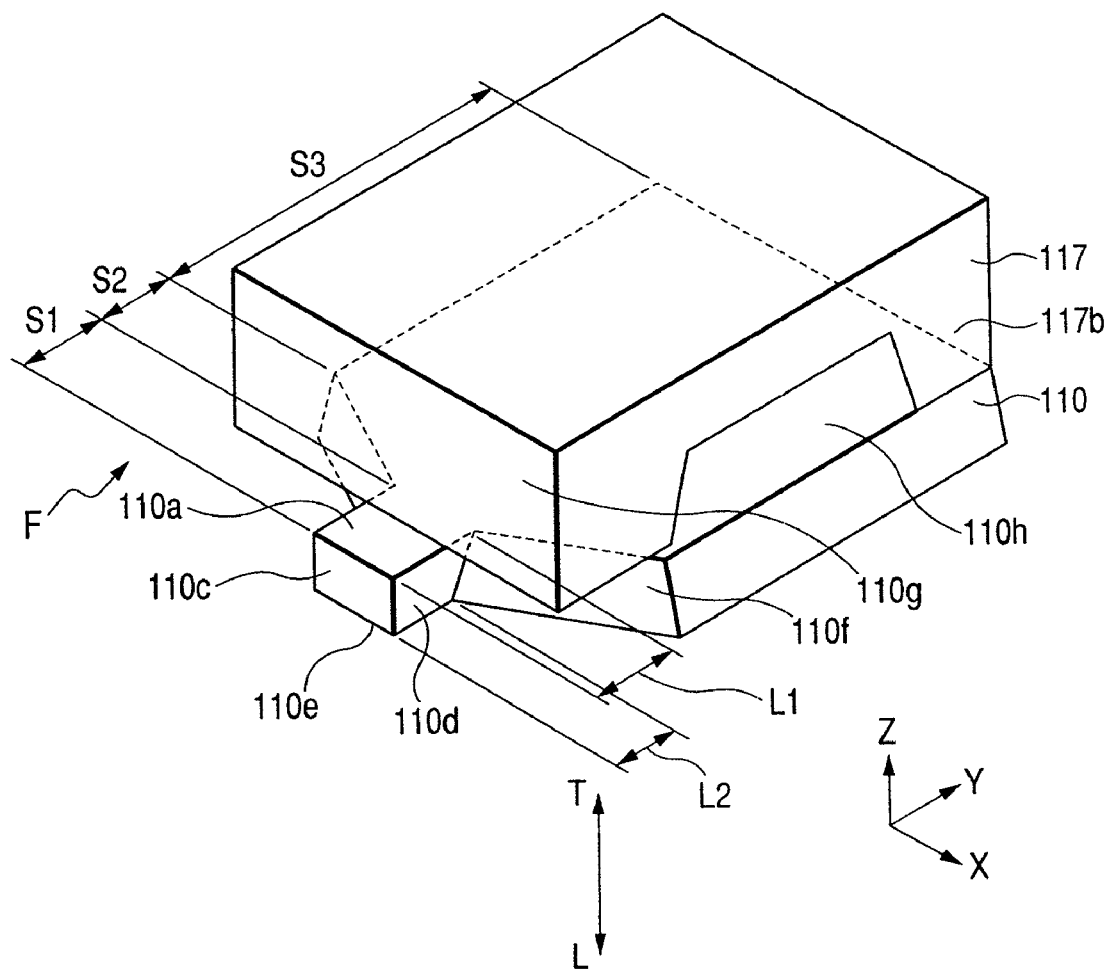
FIG. 2 is a perspective view showing main parts of the magnetic head shown in FIG. 1.
Figure 3:
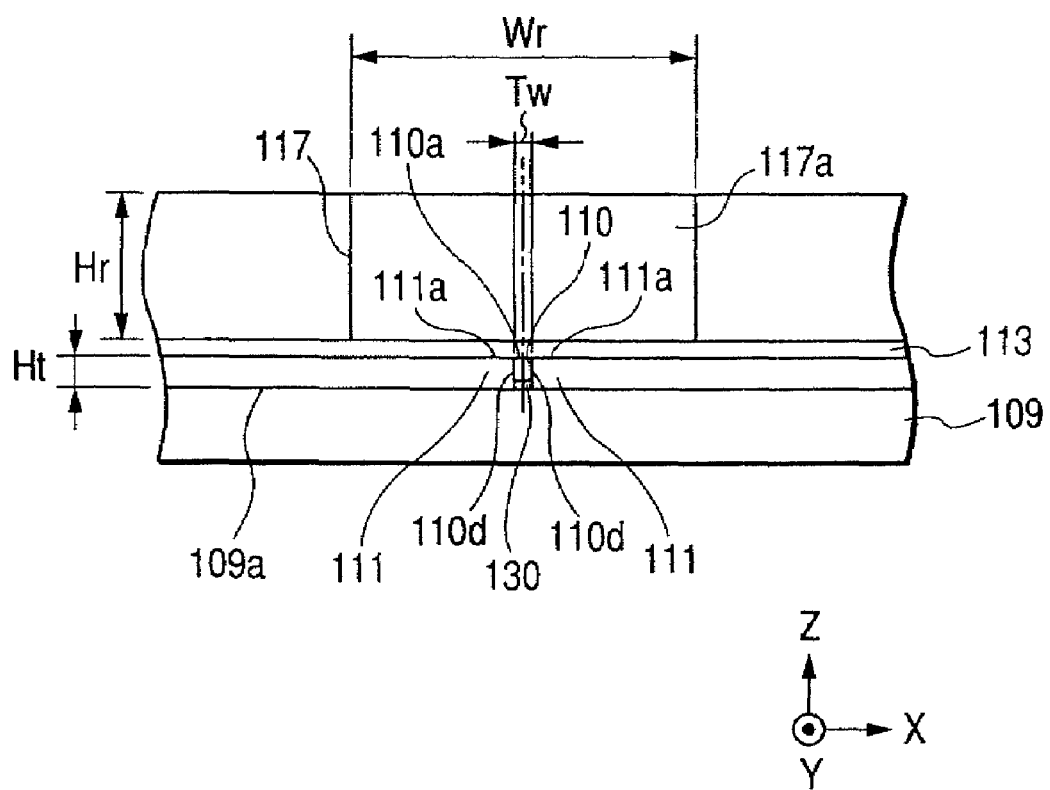
FIG. 3 is a front view of the magnetic head shown in FIG. 1.
Figure 4:
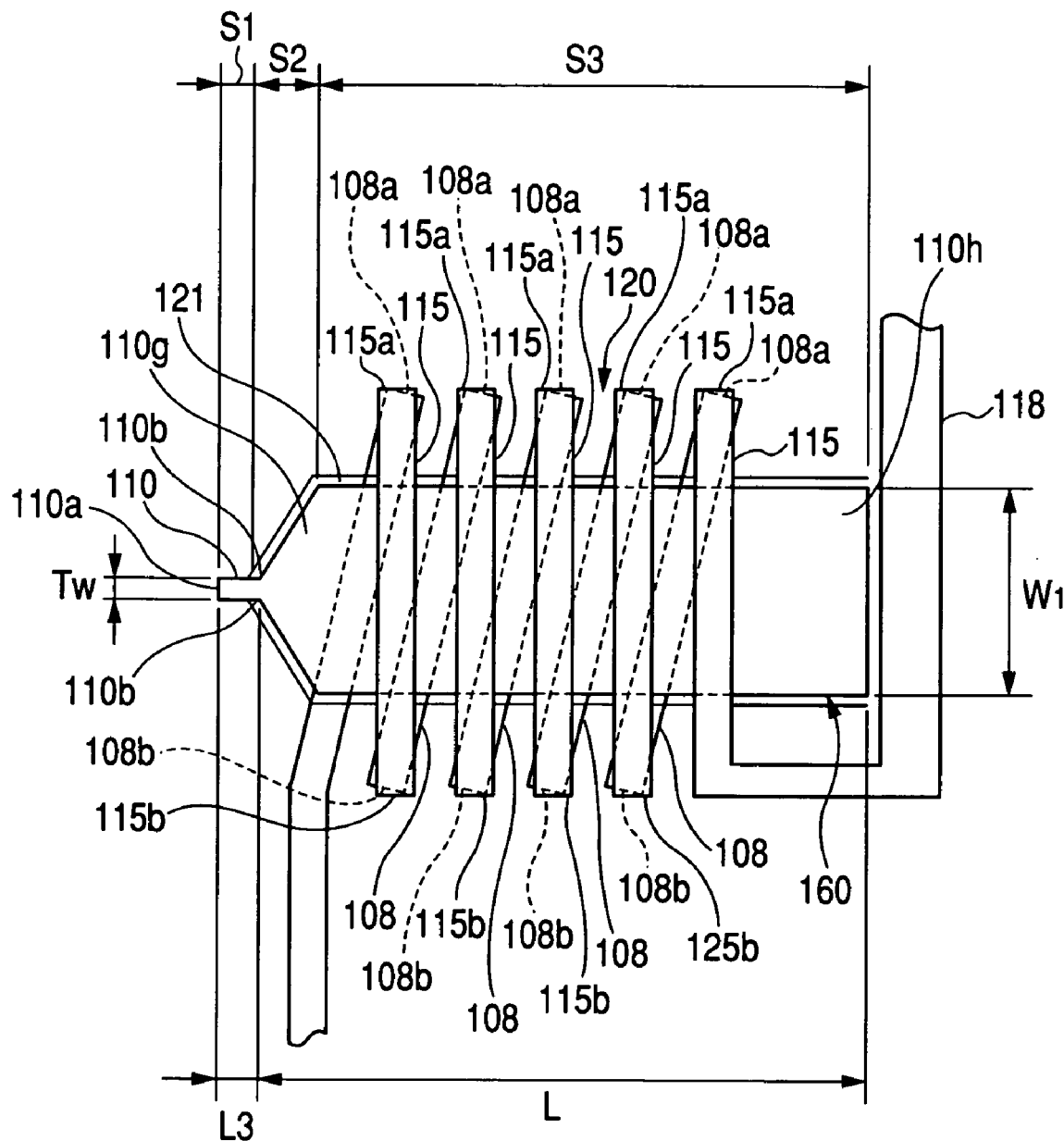
FIG. 4 is a plan view of the magnetic head shown in FIG. 1.
Figure 4:
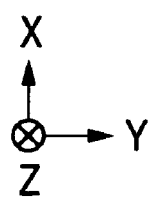

FIG. 1 is a cross-sectional view showing a magnetic head according to a first embodiment, FIG. 2 is a perspective view showing main parts of the magnetic head shown in FIG. 1, FIG. 3 is a front view of the magnetic head shown in FIG. 1, and FIG. 4 is a plan view of the magnetic head shown in FIG. 1.

A magnetic head H1 shown in FIG. 1 provides a vertical magnetic field to a recording medium M and is called a vertical recording magnetic head. The magnetic field magnetizes a hard film Ma of the recording medium M in the vertical direction.

The recording medium M may be, for example, disc-shaped, has the hard film Ma having high remnant magnetization on the surface thereof, and a soft film Mb having high magnetic permeability therein lying under the hard film Ma. The disk rotates around an axis perpendicular to the disk surface and passing through the center thereof.

A slider 101 may be made of non-magnetic materials such as $Al_2O_3$ or TiC. A facing surface 101a of the slider 101 faces the recording medium M. If the recording medium M turns, the slider 101 either floats with respect the surface of the recording medium M due to the airflow on the surface or the slider 101 slides on the recording medium M. In FIG. 1, the recording medium M moves in a direction D with respect to the slider 101. Accordingly, the upward direction in the figure is the trailing side T and the downward direction in the figure is the leading side L of the recording head H1.

A non-magnetic insulation layer 102 made of inorganic materials such as $Al_2O_3$ or $SiO_2$ is formed on a trailing end surface 101b of the slider 101, and a read head portion HR is formed on the non-magnetic insulation layer 102.

The read head portion HR includes a lower shield layer 103, an upper shield layer 106, and a read element 104 located inside an inorganic insulation layer (gap insulation layer) 105 between the lower shield layer 103 and the upper shield layer 106. The read element 104 may be a magneto-resistance effect element such as AMR, GMR, or TMR. Alternatively, the read head portion may be absent.

On the upper shield layer 106, a plurality of first coil layers 108 made of conductive materials is formed with a coil insulation base layer 107 interposed between the first coil layers 108 and the upper shield layer 106. The first coil layers 108 are made of at least one kind of non-magnetic metallic material selected from, for example, Au, Ag, Pt, Cu, Cr, Al, Ti, NiP, Mo, Pd, Rh. Alternatively, the first coil layers 108 may be a laminated structure in which the selected non-magnetic metallic materials are laminated.

A coil insulation layer 109 made of inorganic insulation materials such as $Al_2O_3$ or organic insulation materials such as resist is formed around the first coil layers 108.

An upper surface 109a of the coil insulation layer 109 is formed on a planarized surface, and then a plated base layer 130 is formed on the upper surface 109a. The main magnetic pole layer 110 is formed with a predetermined length in a height direction (a second direction) from the facing surface F on the plated base layer 130, extends with a predetermined length. And the main magnetic pole layer 110 whose width in a direction of a track width (X direction in the figure: a first direction) of a front surface 110c is formed with a track width Tw. The upper surface 109a of the coil insulation layer 109 is the surface where the first magnetic layer is formed. Further, the main magnetic pole layer 110 corresponds to the first magnetic layer. Also the main magnetic pole layer 110 may be, for example, coated with ferromagnetic materials, and is made of materials having high saturation magnetic flux density such as Ni—Fe, Co—Fe, or Ni—Fe—Co.

In the main magnetic pole 110, an inclined portion S2, and a rear portion S3 whose width W1 in the direction of the track width (the first direction) extends wider than the track width Tw, are formed in the height direction (Y direction in the figure: the second direction) from a proximal end 110b of the front portion S1. The track width Tw is formed in a range of 0.01 µm to 0.5 µm, the length of the front portion S1 in the direction of the height is in a range of 0.01 µm to 0.5 µm.

Further, in the rear portion S3, an area having the largest width W1 in the direction of the track width (X direction in the figure) is about 1 µm to 100 µm, a length of the inclined portion S2 and the rear portion S3 in the direction of the height is about 1 µm to 100 µm.

FIG. 1 is a cross-sectional view showing the magnetic head taken along the dashed line in FIG. 2. FIG. 3 is a front view of the magnetic head shown in FIG. 1. As shown in FIG. 3, the main magnetic pole layer 110 at the facing surface F is formed to have a width Tw in the track width direction (X direction).

As shown in FIG. 3, first insulation material layers 111 and 111 are formed at both sides of the main magnetic pole 110.

Further, the height positions (the height positions of the main magnetic pole layer 110 or the first insulation material layer 111 and 111 in the direction of the film thickness, that is, the height positions in the Z direction in the figure) of upper surfaces 111a and 111a of the first insulation material layers 111 and 111 are the same as that of the trailing upper surface 110a of the main magnetic pole 110.

The trailing upper surface 110a of the main magnetic pole layer 110 is formed into a planarized surface or a dish shape in where a concave portion which is concaved downward (the negative Z direction in FIG. 2) is formed in the upper surface 110a.

The first insulation material layers 111 and 111 can be made of, for example, $Al_2O_3$, $SiO_2$, or Al—Si—O.

A gap layer 113 is formed of alumina or $SiO_2$ on the main magnetic pole layer 110 and the first insulation material layers 111 and 111.

As shown in FIG. 1, a second coil layer 115 is formed on the gap layer 113 with a coil insulation base layer 114 interposed therebetween. Similar to the first coil layers 108, a plurality of the second coil layers 115 is formed of conductive materials. The second coil layers 115 are made of at least one of non-magnetic metallic materials selected from, for example, Au, Ag, Pt, Cu, Cr, Al, Ti, NiP, Mo, Pd, and Rh. Alternatively, the second coil layers 115 may be a laminated structure in which the chosen non-magnetic metallic materials are laminated.

As shown in FIG. 4, the first coil layers 108 and the second coil layers 115 establish electrical connections between ends 108a and 115a and between ends 108b and 115b in each track width direction (X direction in the figure). Thus, a toroidal coil layer 140 is formed in which the first coil layers 108 and the second coil layers 115 are coiled around the main magnetic pole 110.

A coil insulation layer 116 is formed of inorganic insulation materials such as $Al_2O_3$ or organic insulation materials such as resist around the second coil layer 115. From above the coil insulation layer 116 to the top of the gap layer 113, a return path layer 117 that is a second magnetic layer is formed of ferromagnetic materials such as permalloy. The return path layer 117 becomes the second magnetic layer.

As shown in FIG. 3, a thickness Ht of the front surface 110c of the main magnetic pole layer 110 is smaller than a thickness Hr of a front end surface 117a of the return path layer 117, and a width Tw of the front surface 110c of the main magnetic pole layer 110 in the direction of the track width is sufficiently smaller than a width Wr of the front end surface 117a of the return path layer 117 in the same direction. As a result, on a facing surface the area of the front surface 110c of the main magnetic pole layer 110 is sufficiently smaller than the area of the front end surface 117a of the return path layer 117. Therefore, leaked magnetic flux φ1 of the recording magnetic field is concentrated on the front surface 110c of the main magnetic pole 110, and the hard film Ma may be magnetized in the vertical direction by the concentrated magnetic flux φ1 to record magnetic data.

The front end surface 117a of the return path layer 117 is exposed to the facing surface. Also, behind the facing surface, a connecting portion 117b of the return path layer 117 and the main magnetic pole layer 110 are connected to each other. This connection forms a magnetic path which passes through the return path layer 117 from the main magnetic layer 110.

In addition, on the gap layer 113, a gap distance defining layer 118 is formed of inorganic or organic materials at a position spaced by a predetermined distance from the facing surface. The distance from the facing surface to a front end edge of the gap distance defining layer 118 defines a gap depth of the magnetic head H1.

In the length direction (Y direction in the figure) of the connecting portion 117b of the return path layer 117, a lead layer 119 extending from the second coil layer 115 is formed via the coil insulation base layer 114. Also, the return path layer 117 and the lead layer 119 are covered with a protecting layer 120 formed of organic or inorganic nonmagnetic insulation materials.

In the magnetic head H1, if a recording electric current is applied to the first coil layers 108 and the second coil layers 115 via the lead layer 119, a recording magnetic field is induced in the main magnetic pole 110 and the return path layer 117. In the facing surface, a magnetic flux φ1 arises from the front surface 110c of the main magnetic pole 110, and then the magnetic flux φ1 of the recording magnetic field goes through the hard film Ma of the recording medium M and passes through the soft film Mb. After recording signals are written on the recording medium M, the magnetic flux φ1 enters the front end surface 117a of the return path layer 117.

FIG. 2 is a perspective view showing the main magnetic pole layer 110 and the return path layer 117 of the magnetic head shown in FIG. 1.

As shown in FIG. 2, in the main magnetic pole layer 110, a side surface 110d of the front portion S1 and a side surface 110f of the inclined portion S2 extends in the direction crossing the track width direction (the first direction; X direction in the figure), and the angle between the side surface 110d of the front portion S1 and the facing surface F is larger than the angle formed between the side surface 10f of the inclined portion S2 and the facing surface F.

Furthermore, the length L1 of the trailing upper surface 110a of the front portion S1 in the height direction (the second direction) is longer than the length L2 of the leading lower surface 110e of the front portion S1 in the height direction (the second direction).

Figure 5:
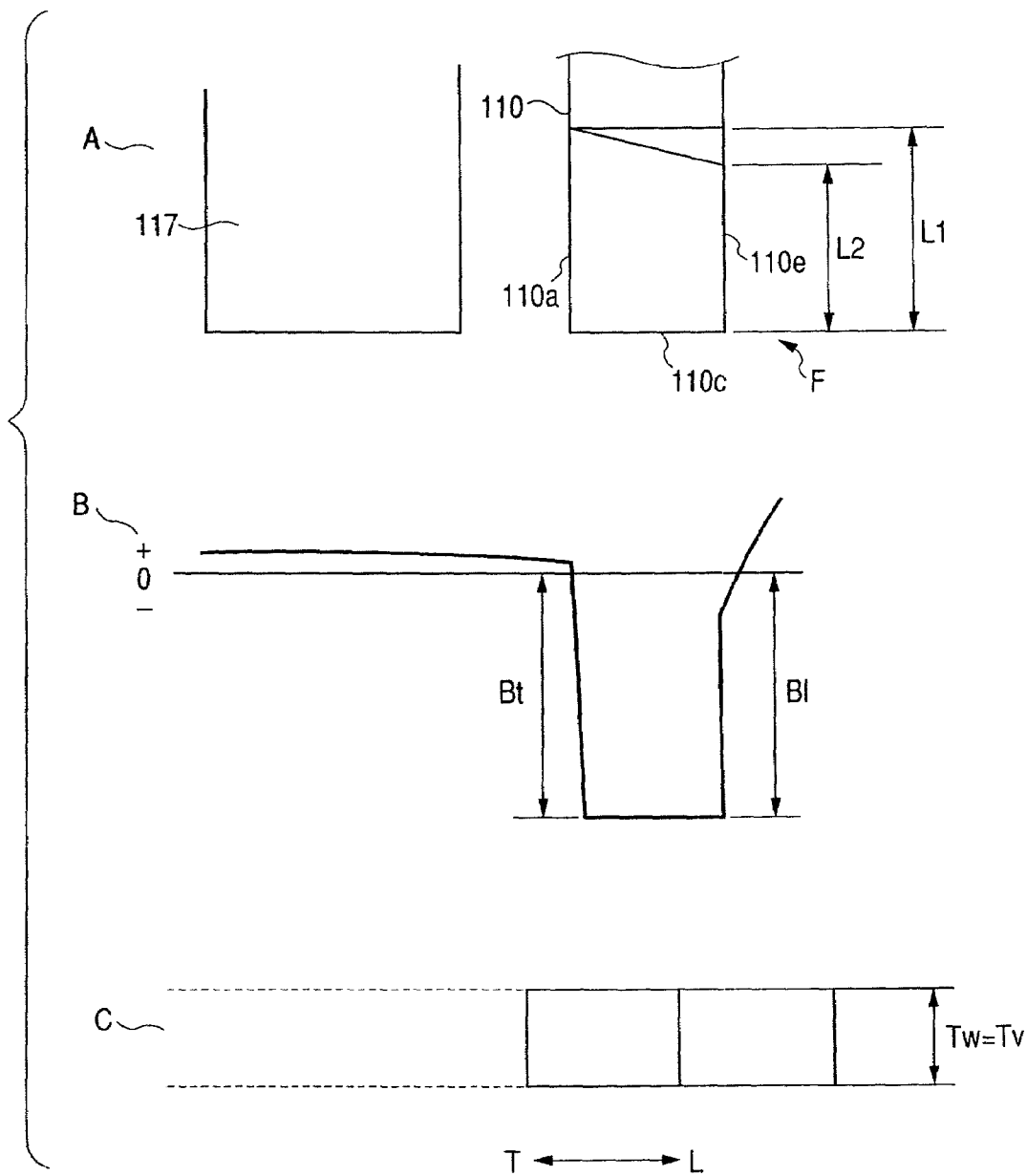
FIG. 5A is an enlarged fragmentary side view of the vicinity of a main magnetic pole layer of the magnetic head shown in FIG. 1 to FIG. 4.
FIG. 5B shows a magnetic field distribution of the recording magnetic field generated from a front surface of the main magnetic pole layer.
FIG. 5C is a plan view of a recording track on the recording medium on which signals are recorded by the magnetic head.

FIG. 5A is an enlarged fragmentary side view of the vicinity of the main magnetic pole layer 110 (the first magnetic layer) and the return path layer 117 (the second magnetic layer) in the magnetic head shown in FIG. 1 to FIG. 4. FIG. 5B shows a magnetic field distribution of the recording magnetic field generated from the front surface 110c of the main magnetic pole layer 110 at the facing surface F, and FIG. 5C is a plan view of a recording track on the recording medium on which signals are recorded by the magnetic head.

The practical width of a recording track on the recording medium becomes larger if side fringing and magnetic permeation of the recording magnetic field occur at the trailing side of the main magnetic pole layer 110.

Since the length L1 of the trailing upper surface 110a of the front portion S1 of the main magnetic pole layer 110 in the height direction (the second direction) is larger than the length L2 of the leading lower surface 110e of the front portion S1 in the height direction (the second direction), the generated magnetic field of the trailing upper surface 110a can be comparatively weakened to suppress the side fringing and magnetic field permeation of the recording magnetic field. Therefore, the practical width Tv of a recording track can be made substantially or exactly equal to the width Tw of the front surface 110c of the main magnetic pole layer 110.

The ratio of magnetic field intensity Bt at the trailing edge to magnetic field intensity Bl at the leading side is defined by the ratio L1/L2. If the ratio L1/L2 becomes bigger, the magnetic field intensity Bt at the wailing side becomes relatively weaker, and if the ratio is about L1/L2≧3, the magnetic field intensity Bt at the trailing side becomes weaker than the magnetic field intensity Bl at the leading side.

The recording magnetic field can be kept sufficiently large by shortening the length L2 of the leading lower surface 110e in the height direction (the second direction) to intensify the generated magnetic field from the leading side.

To make the recording magnetic field large enough, as shown in FIG. 1 to FIG. 4, the front surface 110c of the main magnetic pole layer 110 is formed into a surface parallel to the facing surface F. Further, the front surface 110c of the main magnetic pole layer 110 may be completely exposed to the facing surface F. The front surface 110c of the main magnetic pole layer 110 may be covered with a protecting film having a thickness of less than 0.1 μm and covering the facing surface F.

As shown in FIG. 1 and FIG. 2, the front portion S1, inclined portion S2 and rear portion S3 of the main magnetic pole layer 110 may be an integrally formed magnetic material layer. Since the front portions S1 and the inclined portion S2 are formed on the upper surface 109a of the coil insulation layer 109, both of them are formed on the same plane. The trailing upper surface 110a of the front portion S1 and the trailing upper surface 110g of the inclined portion S2 are on the same plane. This can make the flow of magnetic flux inside the main magnetic pole layer 110 smooth to increase the recording magnetic field generated from the upper surface 110c of the main magnetic pole layer 110. In addition to the trailing upper surface 110a of the front portion S1 and the trailing upper surface 110g of the inclined portion S2 in the main magnetic pole layer 110, the trailing upper surface 110a of the front portion S1 and the rear portion S3 and the trailing upper surface 110h in the inclined portion S2 may be on the same plane.

Figure 6:
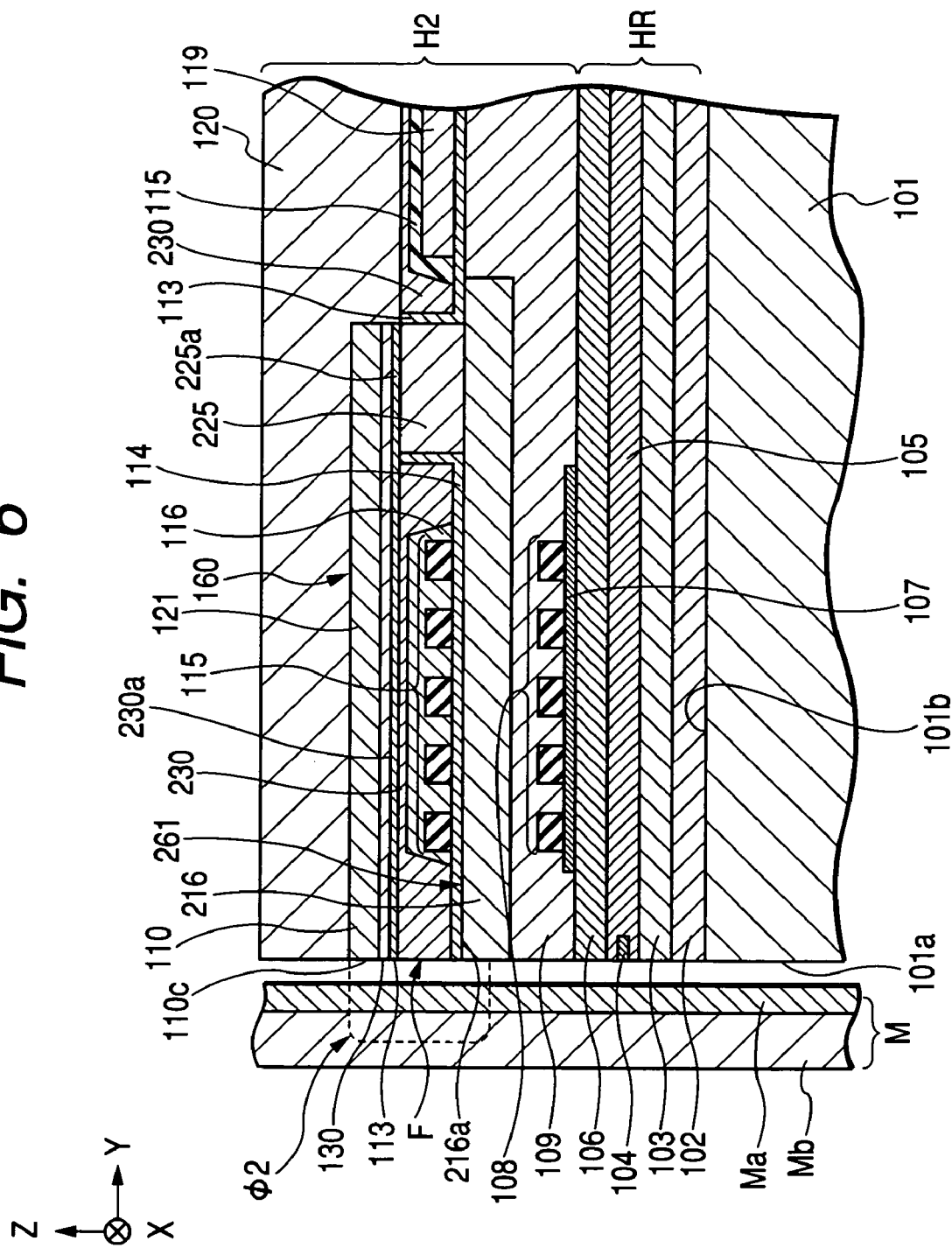
FIG. 6 is a cross-sectional view showing of the magnetic head according to a second embodiment.
Figure 7:
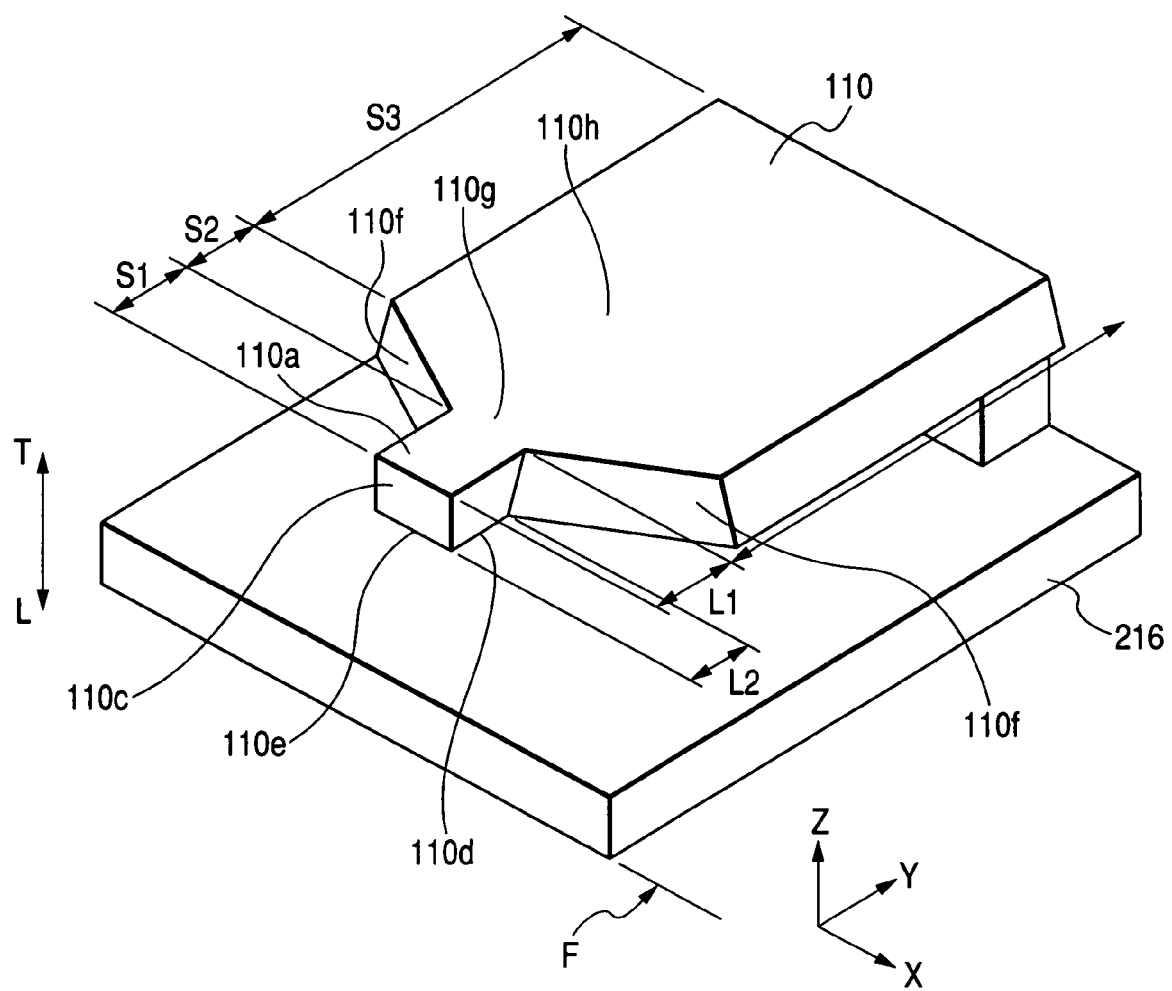
FIG. 7 is a perspective view showing main parts of the magnetic head shown in FIG. 6.

FIG. 6 is a cross-sectional view showing a magnetic head according to a second embodiment, and FIG. 7 is a perspective view showing main parts of the magnetic head shown in FIG. 6.

A magnetic head H2 shown in FIG. 6 and FIG. 7 is also a vertical recording magnetic head which applies a vertical magnetic field to the recording medium M and magnetizes the hard film Ma of the recording medium M in the vertical direction.

Since the magnetic head H2 shown in FIG. 6 and FIG. 7 has many of the same components as the magnetic head H1 shown in FIG. 1 to FIG. 4, the same components of the magnetic head H2 shown in FIG. 6 and FIG. 7 as those of the magnetic head H1 shown in FIG. 1 to FIG. 4 are given the same reference numerals, and the detailed description thereof will be omitted.

As shown in FIG. 6, the read portion HR is formed on the non-magnetic insulation layer 102 formed on the trailing end face 101b of the slider 101.

The recording magnetic head H2 is provided on the read portion HR composed of the lower shield layer 103, the upper shield layer 106, and the read element 104 located inside the inorganic insulation layer (gap insulation layer) 105 between the lower shield layer 103 and the upper shield layer 106. The facing surface F of the magnetic head H2 to the recording medium is in the same plane as the facing surface 101a of the slider 101.

In addition, the vertical magnetic recording magnetic head H2 may be mounted on a trailing end of the slider 101 without providing the read portion HR.

The plurality of first coil layers 108 formed of conductive materials is formed on the upper shield layer 106 with the coil insulation base layer 107 interposed between the first coil layers and the upper shield layer, and the coil insulation layer 109 is formed around the first coil layers 108.

A return path layer 216 formed in the height direction (Y direction in the figure; the second direction) from the facing surface F is formed on the upper surface 109a of the coil insulation layer 109. The return path layer 216 is formed of ferromagnetic materials such as permalloy. The return path layer 216 is the second magnetic layer and becomes a second magnetic portion with respect to a first magnetic portion 160, which will be described later. In the magnetic head H2 shown in FIG. 6, the second magnetic portion constructed by the return path layer 216 becomes a magnetic portion located closer than the first magnetic portion 160 to the read head HR.

A connecting layer 225 made of Ni—Fe, etc. is formed at the rear side in the length direction (Y direction in the figure) of an upper surface of the return path layer 216.

The coil insulation base layer 114 is formed on the return path layer 216, and the second coil layer 115 is formed on the coil insulation base layer 114.

The first coil layers 108 and the second coil layers 115 establish electrical connections between their ends in each track width direction (X direction in the figure). The toroidal coil layer 140 is formed where the first coil layers 108 and the second coil layers 115 are coiled around the return path layer 216.

The coil insulation layer 116 is formed around the second coil layers 115, and is covered with an insulation layer 230. The insulation layer 230 is preferably formed of inorganic insulation materials. As the inorganic insulation materials, at least one can be selected from AlO, $Al_2O_3$, $SiO_2$, $Ta_2O_5$, TiO, AlN, AlSiN, TiN, SiN, $Si_3N_4$, NiO, W0, $WO_3$, BN, CrN, and SiON. An upper surface 230a of the isolation layer 230 is processed to be a planarized surface. The planarizing processing like this can be performed utilizing technology such as CMP.

The gap layer 113, a plated base layer 130 and the main magnetic pole layer 110 are formed on the upper surface 230a of the insulation layer 230. The main magnetic pole layer 110 is the first magnetic layer.

The main magnetic pole layer 110 is formed of the same materials and shape as those of the main magnetic pole layer 110 of the magnetic head according to the first embodiment shown in FIG. 1 to FIG. 4.

As shown in FIG. 7, the side surface 110d of the front portion S1 and the side surface 110f of the inclined portion S2 in the main magnetic pole layer 110 extend in the direction crossing the track width direction (the first direction; X direction in the figure), and the angle between the side surface 110d of the front portion S1 and the facing surface F is larger than the angle formed between the side surface 110f of the inclined portion S2 and the facing surface F.

The length L1 of the trailing upper surface 110a of the front portion S1 in the height direction (the second direction, or Y direction in the figure) is larger than the length L2 of the leading lower surface 110e of the front portion S1 in the height direction (the second direction).

Therefore, similarly to the magnetic head shown in FIG. 1 to FIG. 4, the generated magnetic field of the trailing upper surface 110a is comparatively weakened, to suppress side fringing and magnetic field permeation of the recording magnetic field. Accordingly, the practical width Tv of a recording track can be made substantially or exactly equal to the width Tw of the front surface 110c of the main magnetic pole layer 110.

The recording magnetic field can be maintained large enough by shortening the length L2 of the leading lower surface 110e in the height direction (the second direction) to intensify the generated magnetic field from the leading side L.

In the present embodiment, in order to make the recording magnetic field large enough, the front surface 110c of the main magnetic pole layer 110 is also formed into a flat surface parallel to the facing surface F. Further, the front surface 110c of the main magnetic pole layer 110 is completely exposed to the facing surface F. The front surface 110c of the main magnetic pole layer 110 may be covered with a protecting film having a thickness of less than 0.1 μm and covering the facing surface F.

The front portion S1, inclined portion S2 and rear portion S3 of the main magnetic pole layer 110 may be an integrally formed magnetic material layer. Also, because the front portion S1 and the inclined portion S2 are formed on the gap layer 113, both the front portion S1 and the inclined portion S2 them are formed on the same plane. The trailing upper surface 110a of the front portion S1 and the trailing upper surface 110g of the inclined portion S2 are on the same plane. This can make the flow of magnetic flux in the main magnetic pole layer 110 smooth to increase the recording magnetic field generated from the upper surface 110c of the main magnetic pole layer 110. In addition to the trailing upper surface 110a of the front portion S1 and the trailing upper surface 110g of the inclined portion S2 in the main magnetic pole layer 110, the trailing upper surface 110a of the front portion S1 and the trailing upper surface 110h of the inclined portion S2 in the rear portion S3 are on the same plane.

A method of manufacturing the main magnetic pole layer 110 (the first magnetic layer) with respect to a method of manufacturing the magnetic head shown in FIG. 1 to 4 will be described.

The read portion HR is formed on the slider 101 by utilizing a sputtering method and a plating method, and the coil insulation base layer 107, the first coil layer 108, and the coil insulation layer 109 are formed on the read portion HR by utilizing a sputtering method and a plating method. The upper surface 109a of the coil insulation layer 109 is formed into a flat surface.

The plated base layer 130 is formed on the coil insulation layer 109. The plated base layer 130 is formed by such methods such as a sputtering method or an evaporation method.

Next, a resist layer R is applied on to the plated base layer 130. A planar concave portion 300 of the main magnetic pole layer (the first magnetic layer) 110 is formed by exposing and developing the resist layer R.

Figure 8:
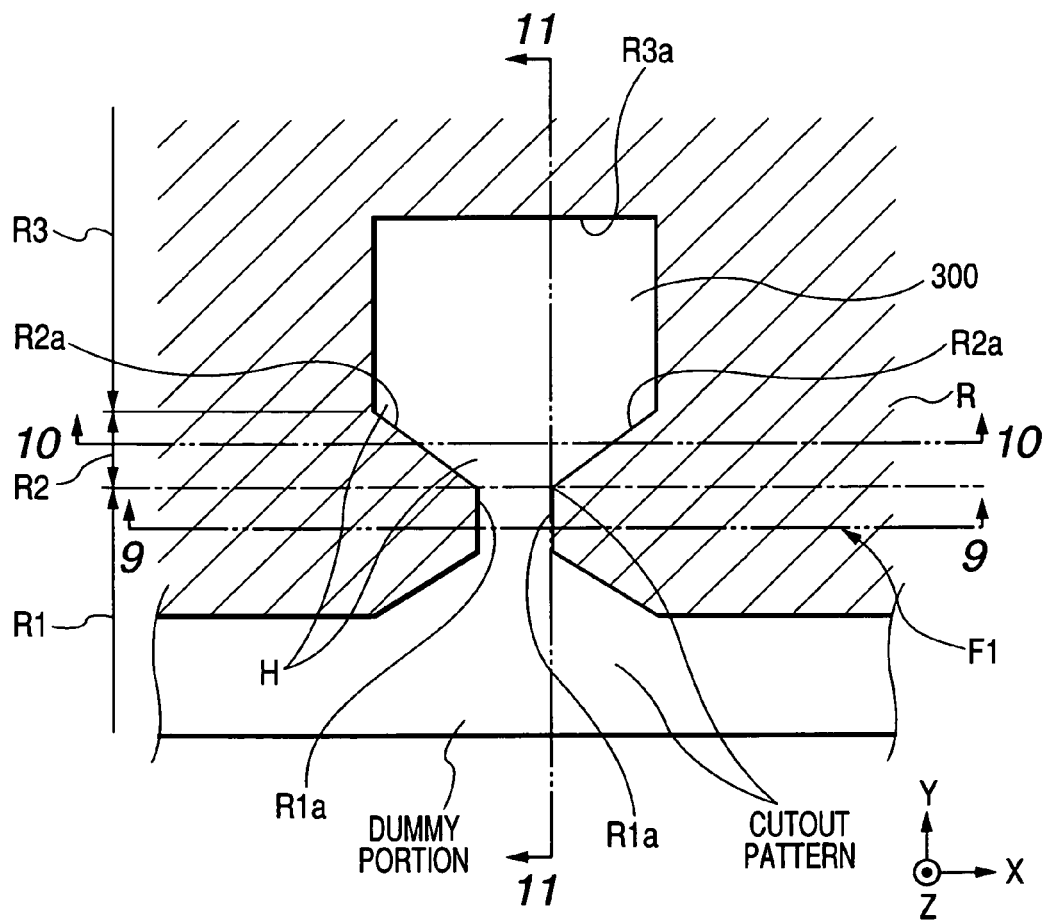
FIG. 8 is a plan view showing a state in which a concave portion is formed in a resist layer.

FIG. 8 is a plan view showing the state in which the concave portion 300 is formed in the resist layer R. The concave portion 300 is composed of a front portion R1, an inclined portion R2 and a rear portion R3. The angle formed between an inner surface R1a of the front portion R1 extending in the direction crossing the track width direction (the first direction; X direction in the figure) and a surface F1 which is a facing surface toward the recording medium is larger than the angle formed between an inner surface R2a of the inclined portion R2 and the surface F1 which is the facing surface. The rear portion R3 has a wider dimension in the track width direction than the front portion R1.

When the inclined portion R2 of the concave portion 300 is exposed the irradiation energy is stronger than the irradiation energy when the front portion R1 is exposed.

In one aspect, then i-ray (ion-beam) exposure is used as an exposing means. After the front portion R1 is exposed, the exposing apparatus is stopped, and then the irradiation energy is intensified and the rear portion R2 is exposed.

In another aspect, when an EB (electron beam) exposure is used as the exposing means, because the irradiation energy can be continuously altered, the irradiation energy when the inclined portion R2 of the concave portion 300 is exposed and the irradiation energy when the front portion R1 is exposed can be easily controlled.

Figure 9:
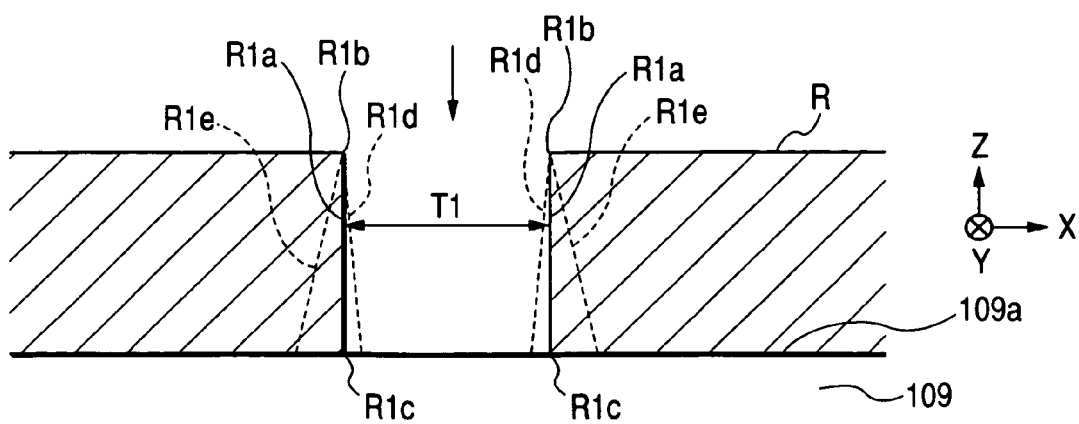
FIG. 9 is a cross-sectional view showing the resist layer as cut along a line 9-9 in FIG. 8 and seen from the direction of the arrow.
Figure 10:
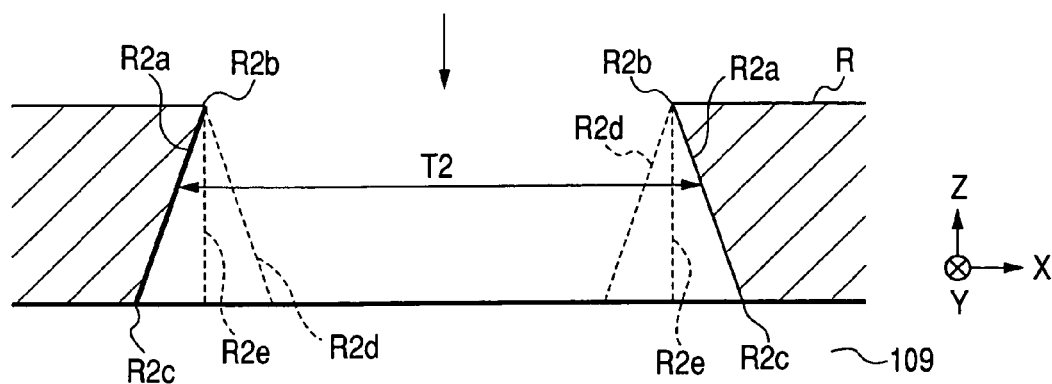
FIG. 10 is a cross-sectional view showing the resist layer as cut along a line 10-10 in FIG. 8 and seen from the direction of the arrow.

FIG. 9 is a cross-sectional view showing the resist layer R as cut along a line 9-9 of FIG. 8 and seen from the direction of the arrow. FIG. 10 is a cross-sectional view showing the resist layer R as cut along the line 10-10 of FIG. 8 and seen in the direction of the arrow.

That is, FIG. 9 shows a sectional shape of the front portion R1 of the concave portion 300 formed in the resist layer R. FIG. 10 shows a sectional shape of the inclined portion R2 of the concave portion 300 formed in the resist layer R.

If the irradiation energy of exposure is small, the dimension of the concave portion 300 in the track width direction (the first direction; X direction in the figure) gradually becomes smaller in the downward (-Z) direction, and if the irradiation energy of exposure is great, the dimension of the concave portion 300 in the track width direction (the first direction; X direction in the figure) gradually becomes larger in the downward (-Z) direction.

By adjusting the irradiation energy of exposure, the dimensions T1 between the inner surfaces R1a and R1a of the front portion R1 of the concave portion 300 in the track width direction may be the same from upper ends R1b and R1b to lower ends R1c and R1c. The inner surfaces R1a and R1a of the front portion R1 of the concave portion 300 are vertical with respect to the upper surface 109a of the coil insulation layer 109. However, the inner surfaces R1a and R1a of the front portion R1 of the concave portion R 300 need not be vertical with respect to the upper surface 109a of the coil insulation layer 109. For example, the distance between a pair of the inner surfaces R1a and R1a facing each other gradually becomes small from the upper ends R1b and R1b toward the lower ends R1c and R1c. As a result, the inner surfaces R1a and R1a may become an inclined surface as shown by dashed lines R1d and R1d. Alternatively, the distance between a pair of the inner surfaces R1a and R1a facing each other gradually becomes larger from the upper ends R1b and R1b toward the lower ends R1c and R1c. As a result, the inner surfaces R1a and R1a may become an inclined surface as shown by dashed lines R1e and R1e.

The irradiation energy of exposure is adjusted to make the dimensions T2 between the inner surfaces R2a and R2a of the inclined portion R2 of the concave portion 300 larger from the upper ends R2b and R2b toward the lower ends R2c and R2c. In the present embodiment, the irradiation energy when the inclined portion R2 of the concave portion 300 is exposed is greater than the irradiation energy when the front portion R1 is exposed.

Figure 11:
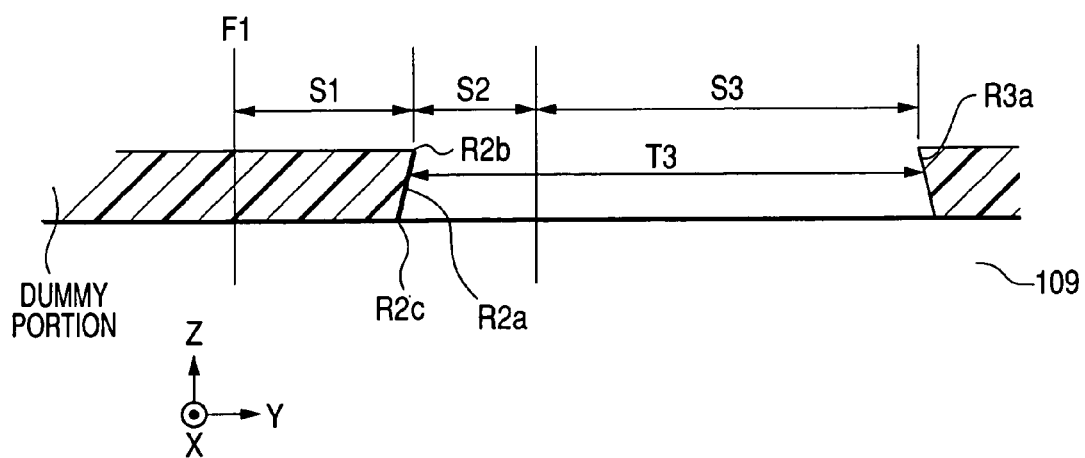
FIG. 11 is a cross-sectional view showing the resist layer as cut along a line 11-11 in FIG. 8 and seen from the direction of the arrow.

FIG. 11 is a cross-sectional view showing the resist layer R as cut along a line 11-11 of FIG. 8 and seen from the direction of the arrow. As described above, when the inclined portion R2 of the concave portion 300 is exposed and developed, a dimension T3 in the height direction between the inner surface R2a of the inclined portion R2 and a rear end R3a of the rear portion R3 in the concave portion 300 gradually becomes larger from the upper side toward the lower side. In this case, the inner surface R2a of the inclined portion R2 of the concave portion 300 becomes an inclined surface inclined backward in the height direction (Y direction in the figure; the second direction) from the lower end R2c toward the upper end R2b.

Figure 12:
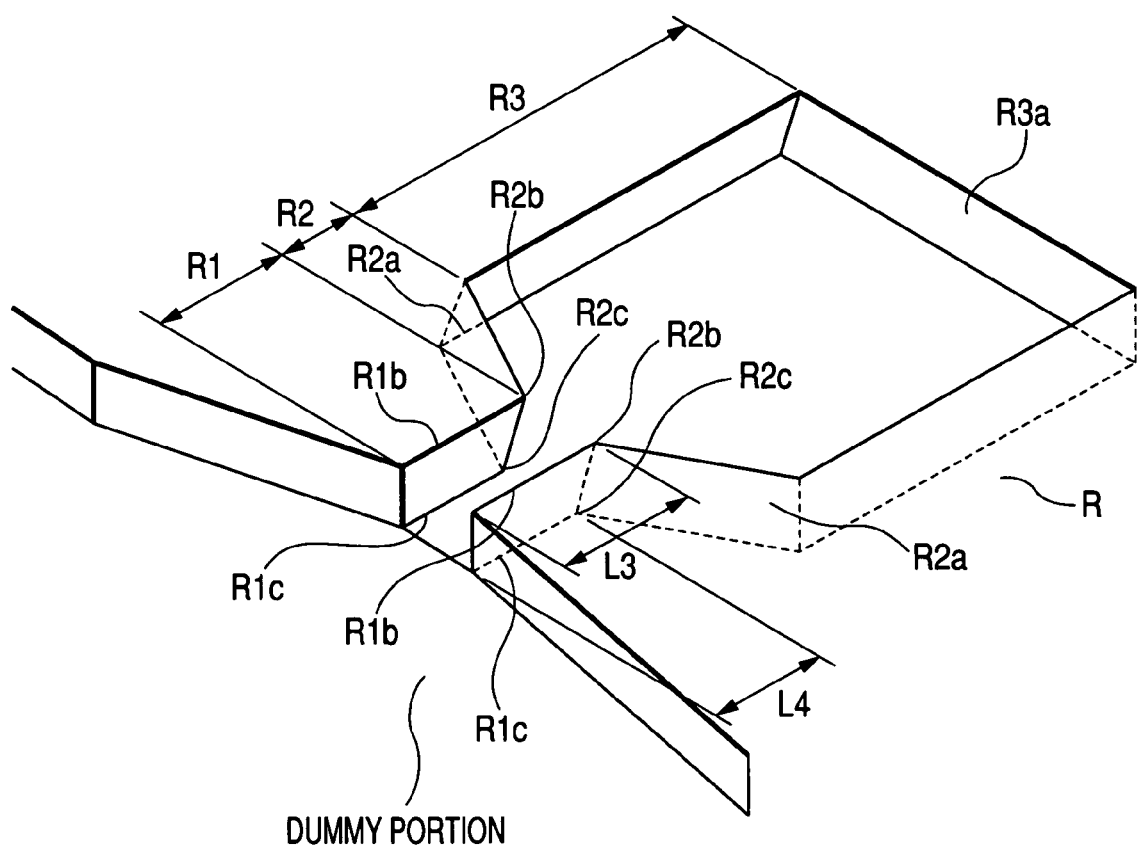
FIG. 12 is a perspective view showing the resist layer in which the concave portion is formed.

FIG. 12 is a perspective view showing the resist layer R in which the concave portion 300 is formed. If the inner surface R2a of the inclined portion R2 of the concave portion 300 is an inclined surface inclined backward in the height direction (Y direction in the figure; the second direction) from the lower end R2c toward the upper end R2b, a length L3 of the upper end R1b of the inner surface R1 of the front portion R1 in the height direction (the second direction; Y direction in the figure) becomes larger than a length L4 of the lower end R1c of the inner surface R1a in the height direction (the second direction; Y direction in the figure).

After the concave portion 300 is formed, the main magnetic layer 110 (the first magnetic layer) is plated inside the concave portion 300, and when the resist layer R is removed, the main magnetic pole layer 110 of the magnetic head shown in FIG. 1 to 4 can be obtained.

In addition, the upper surface 110a of the front portion S1 of the main magnetic pole layer 110 (the first magnetic layer) formed in the front portion R1 of the concave portion 300 and the upper surface 110g of the inclined portion S2 of the main magnetic pole layer 110 (the first magnetic layer) formed in the inclined portion R2 of the concave portion 300 are plated to be located on the same plane.

Furthermore, the front portion S1 of the main magnetic pole layer 110 (the first magnetic layer) is shaved off parallel to the plane which is the facing surface F1 toward the recording medium. The front surface of the front portion S1 at the facing surface F is formed into a flat surface parallel to the facing surface F. Since this makes it possible to planarize the front surface 110c of the main magnetic pole layer 110 (the first magnetic layer), the recording magnetic field generated from the magnetic head can be increased. In this case, it is preferable to completely expose the front surface of the main magnetic pole layer 110 (the first magnetic layer) to the facing surface F.

In the magnetic pole layer 110 obtained in this manner, the length L1 of the trailing upper surface 110a of the front portion S1 in the height direction (the second direction; Y direction in the figure) is longer than the length L2 of the leading lower surface 110e of the front portion S1 in the height direction (the second direction).

Therefore, similar to the magnetic head in FIG. 1 to 4, the generated magnetic field of the trailing upper surface 110a can be comparatively weakened to suppress the side fringing and magnetic field permeation of the recording magnetic field. Accordingly, the practical width Tv of a recording track can be made substantially or exactly equal to the width Tw of the front surface 110c of the main magnetic pole layer 110.

Meanwhile, the recording magnetic field can be kept large enough by shortening the length L2 of the leading lower surface 110e in the height direction (the second direction) to intensify the generated magnetic field from the leading side L.

EXAMPLE 1

Figure 13:
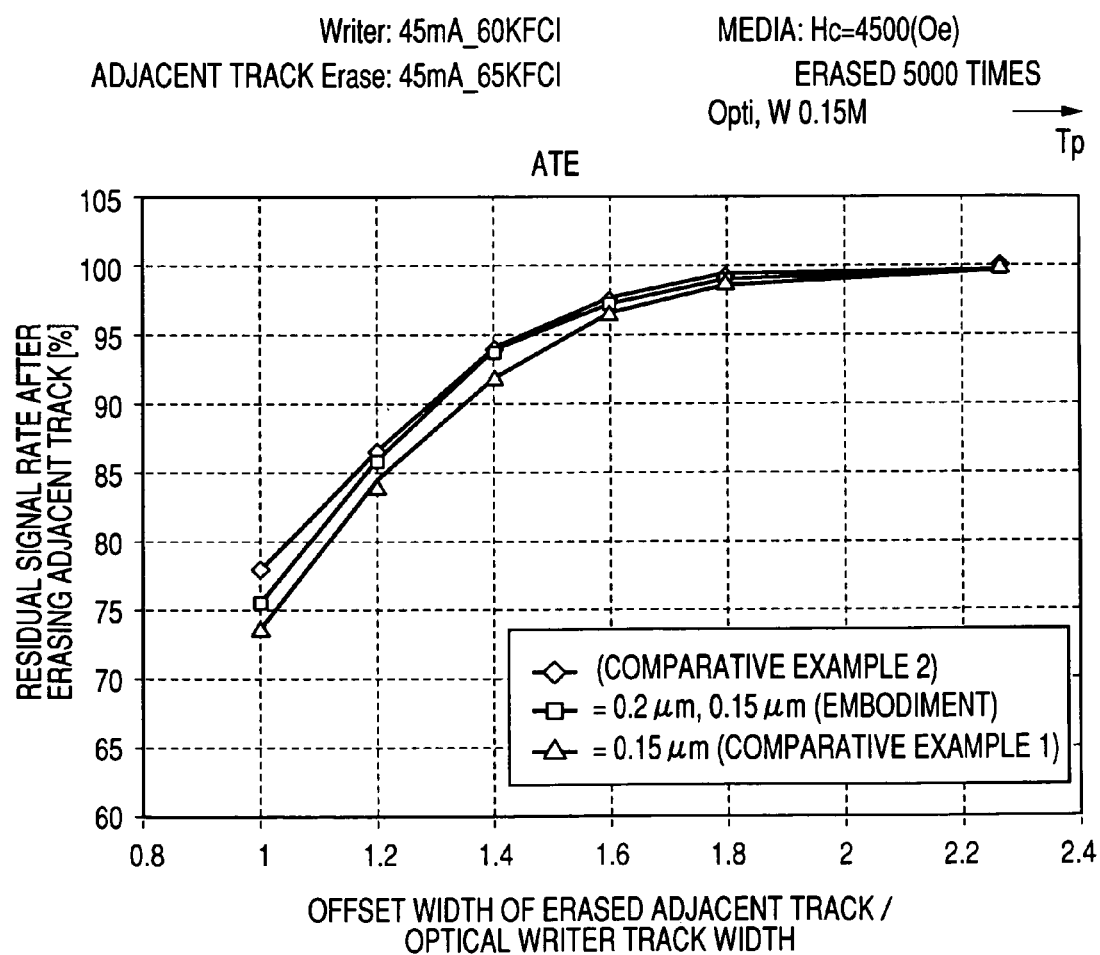
FIG. 13 is a graph showing a residual signal rate of a main track when an adjacent track is erased.
Figure 14:
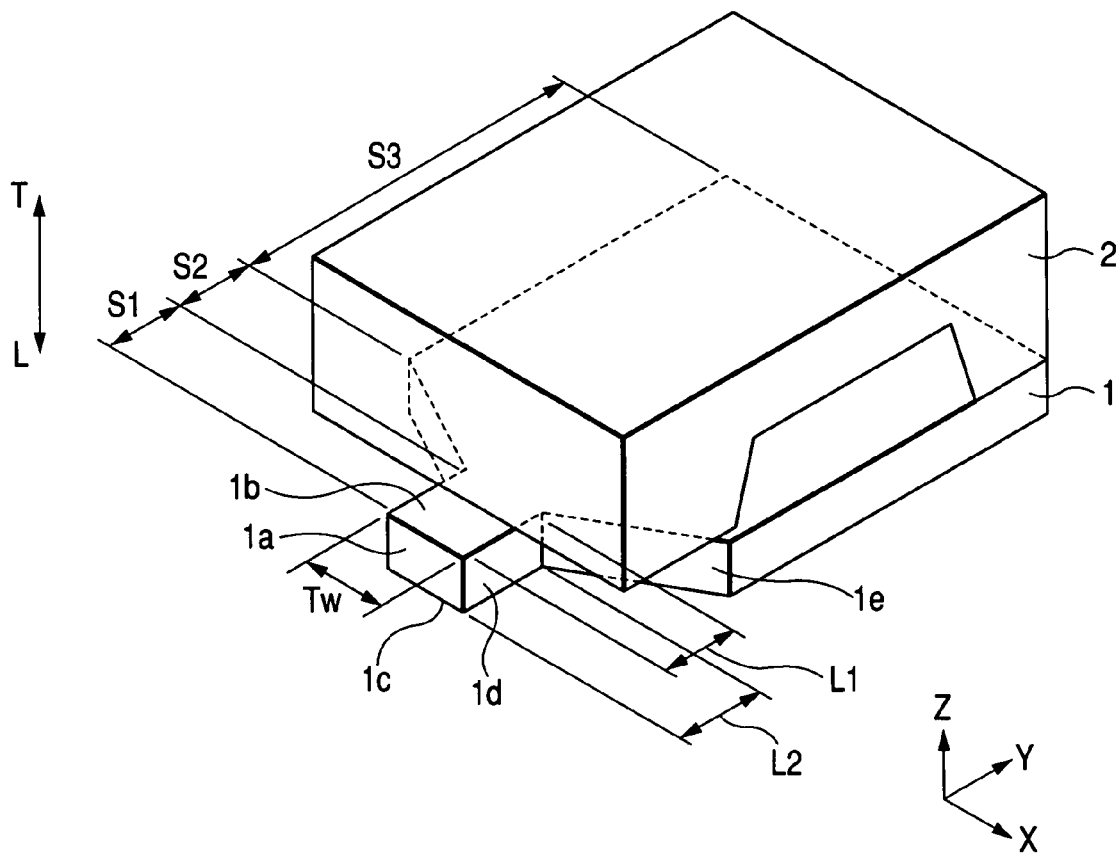
FIG. 14 is a schematic perspective view showing a conventional recording head of vertical magnetic recording type.
Figure 15:
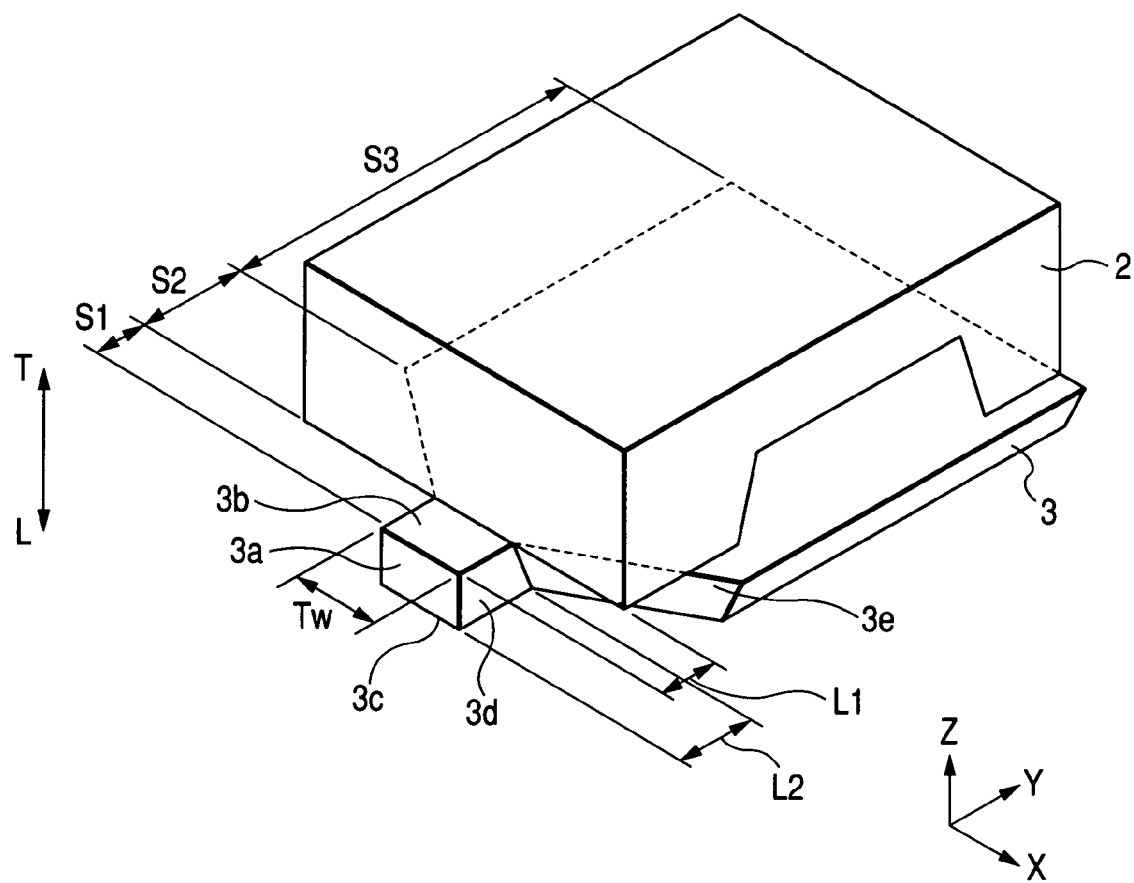
FIG. 15 is a schematic perspective view showing a conventional recording magnetic head of vertical magnetic recording.
Figure 16:
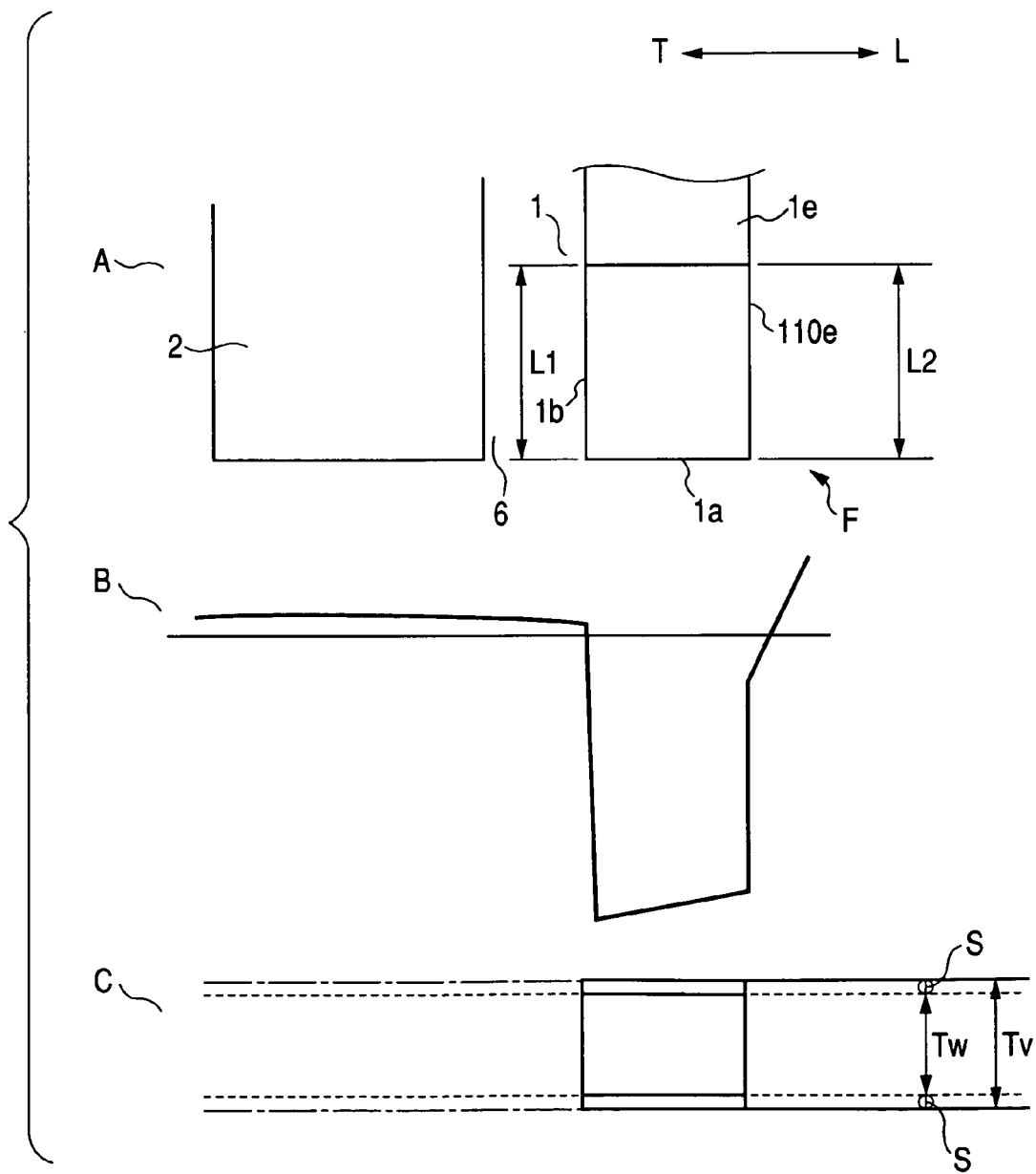
FIG. 16A is an enlarged fragmentary side view of the vicinity of a first magnetic layer and a second magnetic layer in the magnetic head shown in FIG. 14.
FIG. 16B shows a magnetic field distribution of a recording magnetic field generated from a front surface of the main magnetic pole layer at the facing surface.
FIG. 16C is a plan view of a recording track on the recording media on which signals are recorded by the magnetic head.
Figure 17:
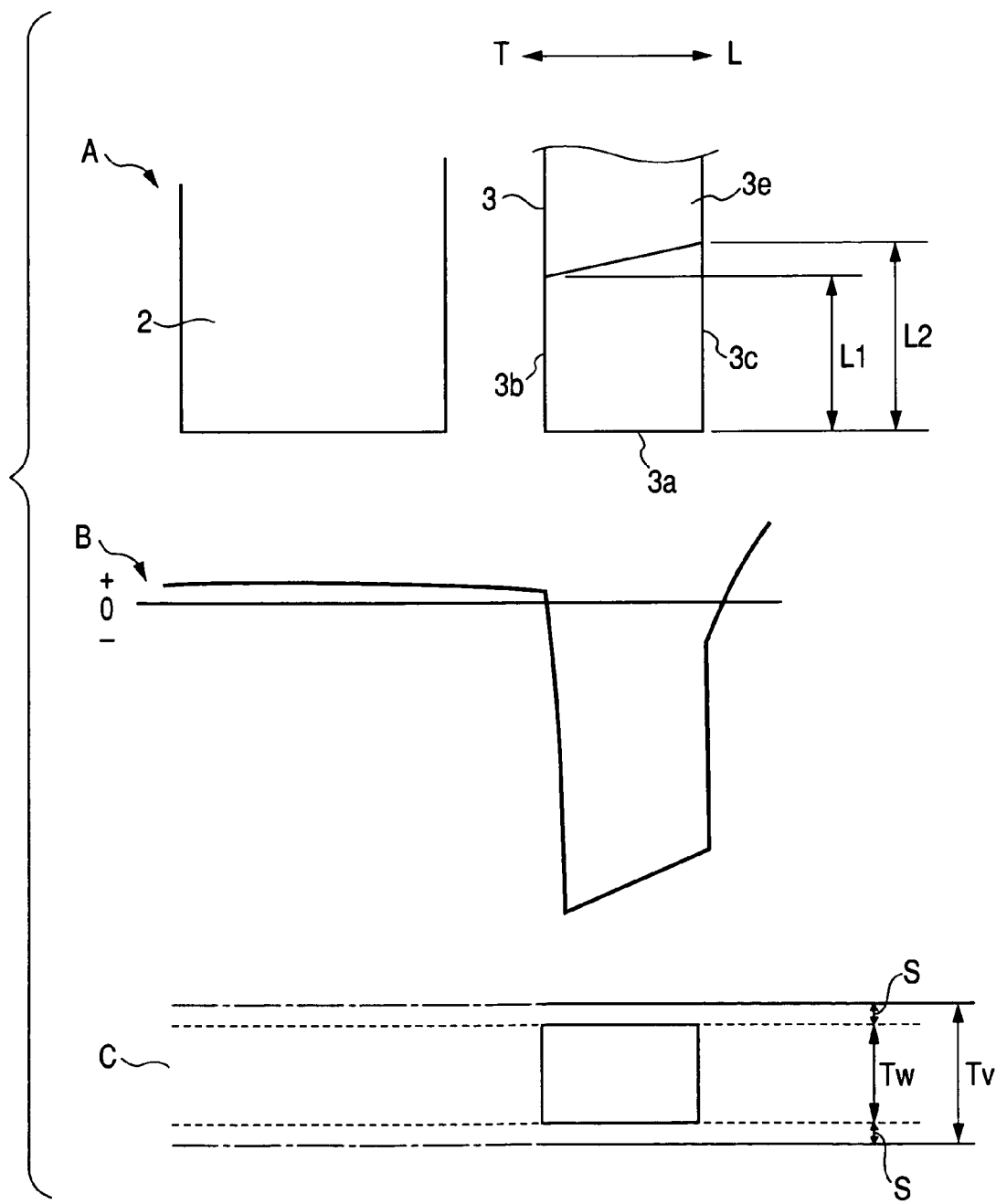
FIG. 17A is an enlarged fragmentary side view of the vicinity of a first magnetic layer and a second magnetic layer in the magnetic head of FIG. 15.
FIG. 17B shows a magnetic field distribution of the recording magnetic field generated from a front surface of the first magnetic layer at the facing surface toward the recording medium.
FIG. 17C is a plan view of the recording track on the recording medium on which signals are recorded by the recording head.
Figure 18:
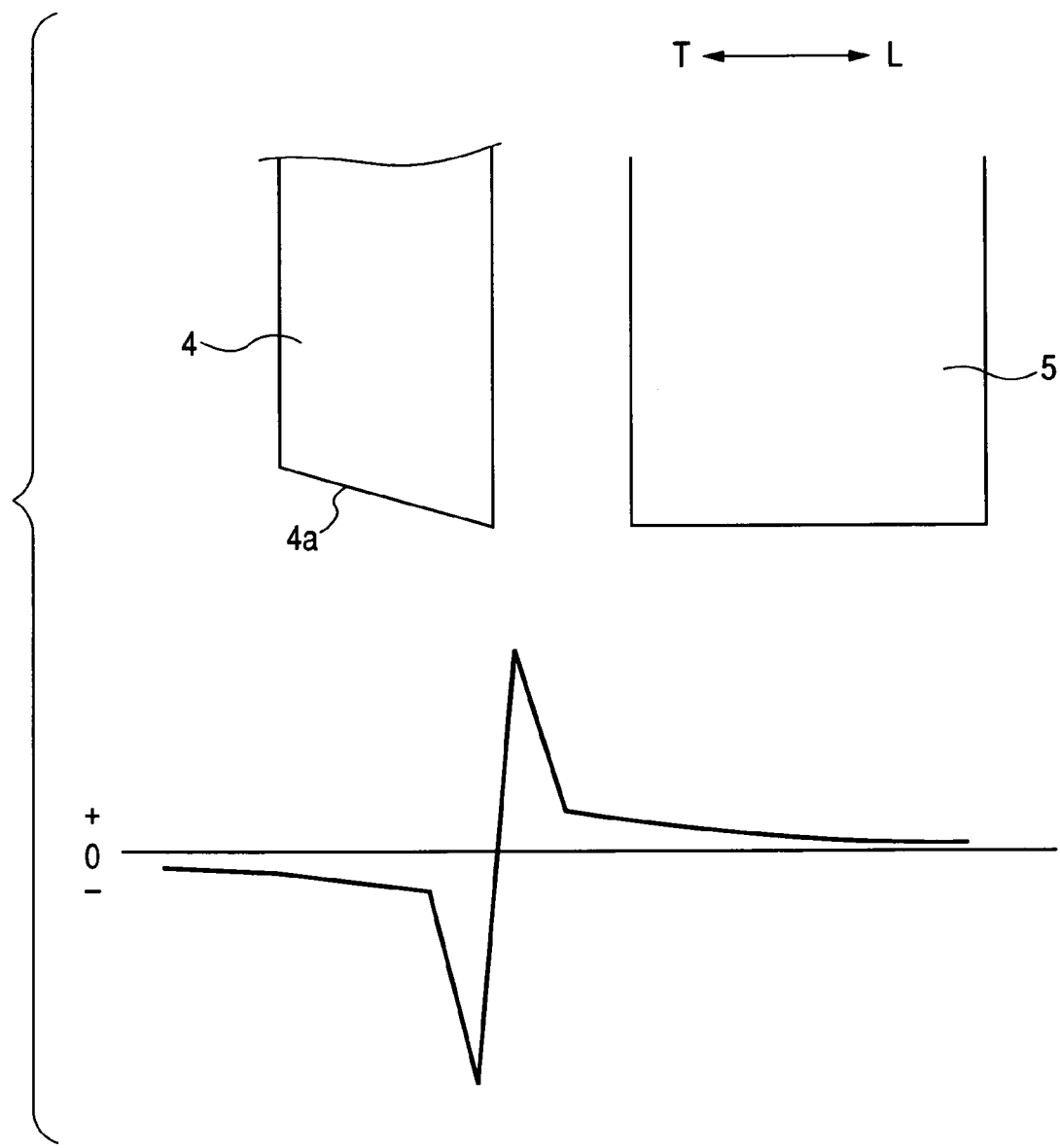
FIG. 18 shows an enlarged fragmentary side view of the vicinity of an upper magnetic pole layer and a lower magnetic pole layer in a recording head disclosed in Japanese Unexamined Patent Application No. 11-250416, and a magnetic field distribution of the recording magnetic field generated from the front surface of the upper magnetic pole.

FIG. 13 is a graph in which the residual signal rate of the main track of the magnetic head according to the embodiment shown in FIG. 1 to FIG. 4 is compared with the residual signal rate of the main track of the magnetic head of a comparative example shown in FIG. 14 when an adjacent track is erased. Here, in Example 1, the length L1 (=0.2 μm) of the trailing upper surface 110a of the front portion S1 of the main magnetic pole layer 110 in the height direction (the second direction) is larger than the length L2 (=0.15 μm) of the leading lower surface 110e in the height direction (the second direction).

In Comparative Examples 1 and 2, the length L1 of the trailing upper surface 1b of the front portion S1 of the main magnetic pole layer 1 in the height direction (the second direction) is equal to the length L2 of the leading lower surface 1c in the height direction (the second direction). In Comparative Example 1, the equation L1=L2=0.15 μm, is satisfied, and in the Comparative Example 2, the equation L1=L2=0.2 μm, is satisfied.

In both Example 1 and comparative examples, the film thickness of the main magnetic pole layer is 0.25 μm.

The residual signal rate is shown as a percentage in the longitudinal axis of FIG. 13 is a measured residual signal rate when an erased track is formed by applying an erasing magnetic field (current value 45 mA; frequency 60 kFCI (thousand flux changes per inch)) in the lateral direction of the recording track after the recording magnetic field (current value 45 mA; frequency 60 kFCI) is applied to form a recording track. The smaller the side fringing and magnetic field permeation of the recording magnetic field from the main magnetic pole layer when erasing the adjacent track is, the closer the residual signal rate of the recording track approaches 100%. Therefore, the residual signal rate is an indicator for indicating side fringing properties of the main magnetic pole layer of the magnetic head.

On the transverse axis, the interval between the center of the recording track and the center of the erased track is the 'offset width of erased adjacent track', which is divided by the optical track width Tw to normalize the data. Further, the coercivity (Hc) of the recording medium is 4500 (Oe) and the erasing operation has been performed 5000 times.

As shown in FIG. 13, the residual signal rate of Example 1 is larger than that of Comparative Example 1. It is known that side fringing and distribution of recording flux from the main magnetic pole layer become small by making the length of the trailing upper surface 110a of the front portion S1 in the height direction longer than the length of the leading lower surface 110e in the height direction.

Example 1 and Comparative Example 2 show the same residual signal rate. In this situation the generated magnetic field (the recording magnetic field) of the magnetic head in Example 1 is larger than the magnetic head of Comparative Example 2. Thus, magnifying the recording magnetic field of the recording magnetic field head and suppressing the side fringing and magnetic field permeation of the recording magnetic field can be compatibly achieved.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A magnetic head comprising:
   a first magnetic layer and a second magnetic layer facing each other with a predetermined gap in a film width direction, each magnetic layer having a facing surface;
   a coil layer formed between the first magnetic layer and the second magnetic layer; and
   a front surface of the first magnetic layer formed with a substantially constant predetermined width in a first direction on the facing surface,
   wherein the first magnetic layer has a front portion and an inclined portion, side surfaces of which extend in directions crossing the first direction, each side surface forms a different angle with respect to the facing surface, and an absolute value of an angle formed between the side surface of the front portion and the facing surface is larger than an absolute value of an angle formed between the side surface of the inclined portion and the facing surface,
   wherein the first direction is a track width direction,
   wherein a second direction is orthogonal to the facing surface, and a length of a trailing upper surface of the front portion in the second direction is larger than a length of a leading lower surface of the front portion in the second direction.

2. The magnetic head according to claim 1, wherein the front surface of the first magnetic layer is a surface parallel to the facing surface.

3. The magnetic head according to claim 1, wherein the front surface is completely exposed at the facing surface.

4. The magnetic head according to claim 1, wherein the front portion and the inclined portion of the first magnetic layer are formed in a first plane, and a trailing upper surface of the front portion and a trailing upper surface of the inclined portion are formed in a second plane, the first and second planes disposed parallel to each other.

5. A magnetic head comprising:
   a first magnetic layer and a second magnetic layer facing each other with a predetermined gap in a film width direction, each magnetic layer having a facing surface; and
   a front surface of the first magnetic layer formed with a substantially constant predetermined width in a first direction on the facing surface, wherein the front surface of the first magnetic layer lies within a plane that is substantially parallel to a plane of a front surface of the second magnetic layer, the front surfaces of the first and second magnetic layers are disposed so as to face a recording medium,
   wherein the first magnetic layer has a first front portion and a second front portion, each of the first and second front portions are disposed orthogonal to the facing surface, the first front portion having a length L1 disposed in a trailing position, a second front portion disposed in a leading position and having a length L2, wherein the ratio L1/L2 is such that the variation of a magnetic field at the front surface of the first magnetic layer is minimized,
   wherein the first direction is a track width direction,
   wherein the ratio L1/L2 is greater than about unity.

6. The magnetic head according to claim 5, wherein the ratio L1/L2 is greater than about 3.

7. The magnetic head according to claim 5, wherein the first front portion is a first planar surface, the second front portion is a second planar surface, and the first and second planar surfaces are parallel.

* * * * *